(12) United States Patent
Pulver

(10) Patent No.: US 8,547,893 B2
(45) Date of Patent: Oct. 1, 2013

(54) HYBRID TELECOMMUNICATION SYSTEM, METHOD, AND DEVICE

(76) Inventor: Jeffrey L. Pulver, Great Neck, NY (US)

(*) Notice: Subject to any disclaimer, the term of this patent is extended or adjusted under 35 U.S.C. 154(b) by 714 days.

(21) Appl. No.: 12/487,423

(22) Filed: Jun. 18, 2009

(65) Prior Publication Data

US 2009/0320078 A1 Dec. 24, 2009

Related U.S. Application Data

(60) Provisional application No. 61/073,440, filed on Jun. 18, 2008.

(51) Int. Cl.
*H04H 20/71* (2008.01)
*H04H 20/00* (2008.01)
*H04H 60/00* (2008.01)

(52) U.S. Cl.
CPC ............... *H04H 20/00* (2013.01); *H04H 60/00* (2013.01)
USPC .......................................... 370/312; 455/3.01

(58) Field of Classification Search
USPC ................. 370/310, 312, 315, 316, 328, 352, 370/432; 725/62, 63, 118; 455/3.01–3.06, 455/132, 422.1, 507, 517–521
See application file for complete search history.

(56) References Cited

U.S. PATENT DOCUMENTS

| | | | |
|---|---|---|---|
| 8,018,333 B2* | 9/2011 | Sennett et al. | 340/539.11 |
| 8,036,700 B2* | 10/2011 | Takamura et al. | 455/550.1 |
| 8,054,772 B1* | 11/2011 | Upadhyay et al. | 370/312 |
| 2003/0069002 A1* | 4/2003 | Hunter et al. | 455/404 |
| 2004/0203562 A1* | 10/2004 | Kolsrud | 455/404.1 |
| 2005/0037728 A1* | 2/2005 | Binzel et al. | 455/404.1 |
| 2006/0058004 A1* | 3/2006 | Dolezal et al. | 455/404.1 |
| 2006/0178128 A1* | 8/2006 | Eaton et al. | 455/404.1 |
| 2007/0021099 A1* | 1/2007 | Sato | 455/404.1 |

\* cited by examiner

*Primary Examiner* — Paul H Masur
(74) *Attorney, Agent, or Firm* — Pillsbury Winthrop Shaw Pittman LLP

(57) ABSTRACT

A hybrid telecommunications system, method, and device are provided. The system may include a plurality of unidentified users, a broadcaster, a source of information content, and a packet or switched network. The users may each be equipped with a transreceiving device for receiving broadcast communications and generating communications of their own. According to the method, a broadcaster may receive a first communication, the first communication being directed to the broadcaster over a packet or switched network, from a user or a source of information content. The broadcaster, in turn, broadcasts the first communication to one or more unidentified users. One or more unidentified users who received the first broadcast communication may generate a second communication which is transmitted to the broadcaster. Upon receipt of the second communication by the broadcaster, the broadcaster may broadcast it to one or more unidentified users.

21 Claims, 8 Drawing Sheets

HYBRID TELECOMMUNICATION SYSTEM, METHOD, AND DEVICE

This application claims priority to U.S. provisional application No. 61/073,440 filed Jun. 18, 2008, which is incorporated by reference herein in its entirety.

FIELD OF INVENTION

Hybrid telecommunication systems, methods, and devices are described and provided herein. These include systems, methods and devices that use broadcast technology and selective use of user identification methodologies to promote communication to large audiences with limited bandwidth restrictions.

BACKGROUND

FIG. 1 illustrates a typical cellular telecommunication network 100. One or more identified users 10a, 10b, 10c . . . 10max, each having a cellular communication device (e.g., a cellular phone, laptop computer, etc.), may transmit and receive cellular communications, with a base station 20, via a cellular tower 30. Specific packet communications are sent and received by the cellular tower 30 as communication with a specified user continues. The cellular tower 30 includes one or more antennae for generating and receiving communications between the base station 20 and the one or more identified users 10a, 10b, 10c . . . 10max in channels partitioned for each user. The source 40 is a cellular service provider, which processes the communications, and may further connect, for example, to the public switch telephone network (PSTN).

The users 10a, 10b, 10c . . . 10max are identified and tracked by the base station 20 in order to make packet transfers therebetween. For example, each time a user accesses the cellular network, a vacant communication channel is assigned by the base station 20 to carry the call. Due to constraints on the number of available vacant channels, at any one time, the cellular tower 30 can only accommodate a maximum number of identified users, 10a, 10b, 10c . . . 10max. As such, the number of users in the cellular network is constrained. Moreover, when too many people compete for access to the cellar network (especially when greatly exceeding the maximum numbers of users that the cellular network can accommodate) they can disrupt and/or overload the network, rendering the network useless for all users.

SUMMARY OF INVENTION

Embodiments of the invention provide for hybrid telecommunication where broadcasts are made to unidentified users and responses are made using a flag or other type of signal that can serve to identify the user who is responding. In embodiments, a system is provided that includes a plurality of unidentified users, a broadcaster for broadcasting a communication, a source of information content, and a packet or switched network. The users may each be equipped with a transreceiving device for receiving broadcast communications and transmitting communications of their own back to the broadcaster or to each other.

In embodiments, a method of communicating is provided. The broadcaster may receive a first communication from the user or the source of information, the first communication being directed to the broadcaster for subsequent broadcast to a number of unidentified users. The broadcaster, in turn, may broadcast the first communication to one or more unidentified users using a broadcast technology such as cable, radio, or satellite. One or more unidentified users who received the first broadcast communication may generate a second communication that may be transmitted to the broadcaster. Upon receipt of the second communication by the broadcaster, the broadcaster may broadcast it to one or more unidentified users, may send the second communication to another broadcaster or may do both.

Other embodiments are also possible. These may include these or other features as taught and explained throughout the entire specification, including the drawings, and claims and variants thereof.

BRIEF DESCRIPTION OF THE DRAWINGS

Embodiments are provided, by way of example only, with reference to the accompanying schematic drawings in which corresponding reference symbols indicate corresponding parts, in which.

DETAILED DESCRIPTION

Figure 2:
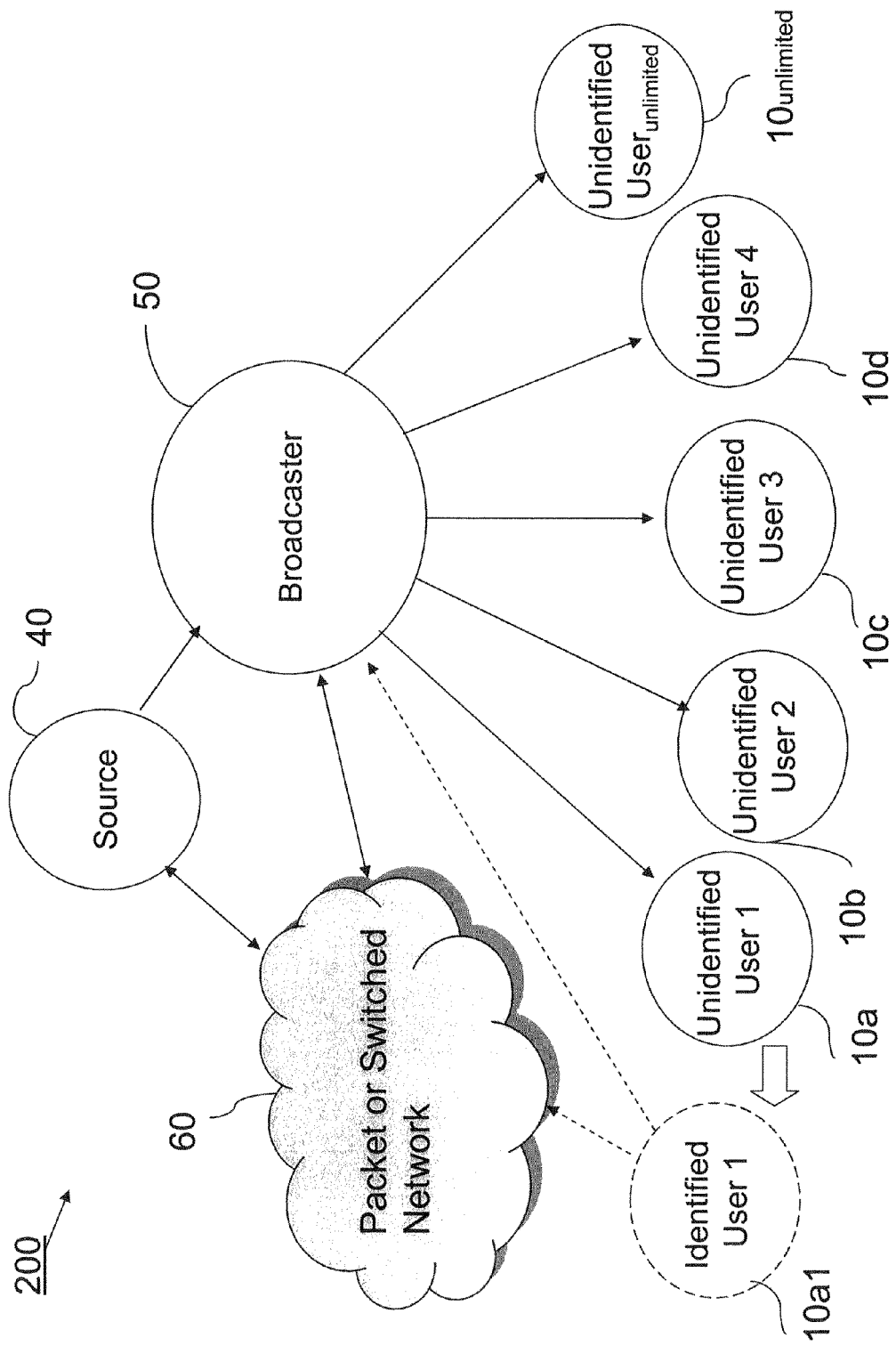
FIG. 2 illustrates a basic architecture of the hybrid telecommunications system, in accordance with certain embodiments of the invention.

FIG. 2 illustrates an example of a basic architecture of the hybrid telecommunications system 200, in accordance with a embodiments of the invention. The architecture 200 may include one or more users 10a, 10b, 10c, . . . 10unlimited, a source 40 of information content, a broadcaster 50, and a packet or switched network 60.

The broadcaster 50, as used herein, may be defined as a device for an "unidentified" distribution of audio, audible communication, video, and/or data signals to an audience. For example, the broadcaster 50 may broadcast using one or more of the following systems: radio frequency (RF) Antennae, satellite, and wired transmission wires.

The users 10a, 10b, 10c . . . 10unlimited are considered "unidentified" to the broadcaster 50. The term "unidentified," as used herein, means that the users are not specifically identified by the broadcaster 50 for the purpose of transmitting the broadcast communication. An example of such a system could mean that users 10 do not necessarily occupy specific broadcast channels or bandwidth of the broadcaster during the transmission. As such, the communication being broadcast may be received by essentially an unlimited number of users, subject to broadcast limitations, such as, for example, signal coverage, power, interference, noise, etc. Thus, broadcasts made in this fashion may not be limited by the number of available communication channels for individual communications of a communication system.

The broadcast technology employed by the broadcaster 50 may include communication technology where users can receive a communication from the broadcaster, without the broadcaster 50 allocating specific communication channels or other resources for each user. Exemplary communication technology employed by the broadcaster 50 may include radio frequency (RF), satellite and transmission wires, as discussed herein. In some implementations, the broadcaster may be a single (point source) transmitter of the communication to an area of unidentified users. In other implementations, the broadcaster may be a distributed network of transmitters, each broadcasting the communications to an area of unspecified users, such as, for example, a simulcast. In one embodiment, conventional cellular, microwave or radio towers may be adapted or otherwise equipped with broadcasting technology, as disclosed herein, thus, becoming a broadcaster 50.

For example, rather than send a specific communication to a certain identified cellular user, the tower may be adapted to send certain communications over a frequency and with a flag that enables any transceiver reachable in the cell, to receive the communication and reproduce it. In certain embodiments, cellular tower employing the invention will broadcast to all users in a cell, regardless of the subscription for receiving cell phone/transceiver. In still other embodiments, the flag may be a signal to certain transceivers in the cell area to listen in while others will not. Thus, there is flexibility in converting existing technology to practice embodiments of the invention.

The media being broadcast may include video, audio (e.g., music, voice, speech, etc.), data, digital still images, multimedia (including television), or combinations thereof. In some implementations, the communication may be "live," a delayed transmission (e.g., 5 second), or pre-recorded. The communication being broadcast may be analog, digital, or both.

Each user 10 may be equipped with a suitable device that can receive and listen to the broadcast communication. For example, the users 10a, 10b, 10c . . . 10unlimited, each may receive the communication using a transreceiving unit, for example, as shown in more detail in FIG. 7. In accordance with embodiments, users 10 may have the capability of being a "listener," a "talker," or both, at any one time.

A "listener," as used herein, is a user who receives the broadcast communication. In some implementations, a listening device may include a radio, television, cable box, cellular phone, computer, satellite dish, citizen-band radio (CB), walkie-talkie, amateur ("ham") radio, or other communication receiving device. The listener does not necessary have to "hear" the broadcast communication per se, but merely has to receive the broadcast, from the broadcaster 50. In some implementations, the user may save the broadcast communication, for example in a memory of the listening device and retrieve it at a later occasion. This may be especially true for data communications. In another implementation, the broadcaster 50 may emit sound waves, for example, from a speaker. In this scenario, the listener may literally "hear" the broadcast communication. Thus, no additional listening device or equipment may be necessary.

A "talker," as used herein, is a user who may generate a communication. The talker does not necessary have to "talk" to transmit the broadcast communication per se, but merely has to transmit a communication. This may be especially true for data communications. The talker may be equipped with a suitable talking device that can generate an uplink path communication, for example, to the broadcaster 50 and/or to each other. In some implementations, the talking device may be a cable box, computer, citizen-band radio (CB), walkie-talkie, amateur ("ham") radio, telephone, cellular phone, or other communication transmitting device. The communication from the talker may be transmitted directly from the user 10 to the broadcaster 50 or the communication may be transmitted via the packet or switched network 60 to the broadcaster 50. The uplink and downlink communication paths and medium from the user 10 to the broadcaster 50 may be the same, or they may be different.

A "conference" may, thus, be defined as the combination of communications that are broadcasted to listeners via the broadcaster and communication generated by the talkers that are transmitted by the broadcaster. According, to embodiments, communications received by the broadcaster 50 from a user or a source 40 may be broadcasted to all users 10a, 10b, 10c . . . 10unlimited.

The example architecture 200 described in FIG. 2, may handle conferences. For example, the one or more users (listeners) 10a, 10b, 10c . . . 10unlimited may listen to the communication broadcasted by the broadcaster 50, using a suitable listening device (if required). If a user 10 wishes to generate a communication, e.g., talk, the user (talker) may use a suitable talking device to generate a communication to the broadcaster 50 and/or other users. The user (talker) may transmit a communication via the broadcaster, without having first listened to a broadcast communication from the broadcaster 50. In some situations, there may not have been a prior broadcast communication from the broadcaster 50, when the user (talker) transmits a communication to the broadcaster 50.

The broadcast communications may be encrypted or coded to protect confidential or sensitive data, even though the users (listeners) may be unidentified. For example, the broadcast communication from the broadcaster 50 or communication generated by any of the users (talkers) 10, may be encrypted using suitable encryption technology. The encryption technology may include, for example, one or more of symmetric-key encryption or public-key encryption. In some embodiments, a 128, 192, or 256 bit key cipher may be used. This may be essentially important for communications concerning military or national security matters.

The source 40 of information content may be linked to the broadcaster 50 for providing information content to the broadcaster 50. In some implementations, the source 40 may be locally connected (e.g., in the same building or nearby) to the broadcaster 50. The source 40 may be remote from (e.g., in a different city, state or country) the broadcaster 50 and the information content is provided to the broadcaster 50 via the packet or switched network 60. The packet or switched network 60 may include a wide area network (WAN), local area network (LAN), Intranet, the Internet, wireless network, microwave network, cellular network, public switch telephone network (PSTN), other networking or data distribution technologies, or combinations thereof. Information may be pushed from the source 40 to the broadcaster 50, requested by the broadcaster 50 from the source 40, including requests by one or more users (talkers) 10, or combinations.

In embodiments, the transceiver of a user may communicate directly with a source 40. The communication may then be sent to the broadcaster 50 and may be rebroadcast and/or retransmitted by the broadcaster 50 to other users 10a, 10b, 10c . . . 10unlimited. As such, communications generated from one or more users 10 may be made available to other users 10 in the broadcast range of the broadcaster and other broadcasters.

Not all communications, however, that are generated from users 10 (talkers) and received by the broadcaster 50 may be broadcasted by the broadcaster 50. For example, communications received from users or the source by the broadcasters 50 may be manually or automatically screened. In one implementation, the broadcaster 50 may apply a rules based algorithm for determining which communications to broadcast. An algorithm may include one or more specified parameters such as time, location, relevance, importance, identity of the user, status of the user, etc. For example, communications received from first responders during an emergency, may receive priority over all other communications, for broadcasting by the broadcaster 50. In other examples, first responders may have priorities based on a talker's status or position, with senior-ranking personnel generally having a higher priority than junior or lower-ranking personnel. Alternatively, or in addition, during an emergency, communications from ordinary civilians might be excluded, altogether, from broadcast by the broadcaster 50.

In one implementation, a communication from only a single talker may be broadcast at any one time. In other implementations, a multiple user or group chat like conversation mode may be provided that permits a number of user to be broadcast substantially in a simultaneous manner. For example, the system may be configured to allow up to a pre-determined number of talkers (e.g., two, three, four, five, or even more) at any one time.

Figure 7:
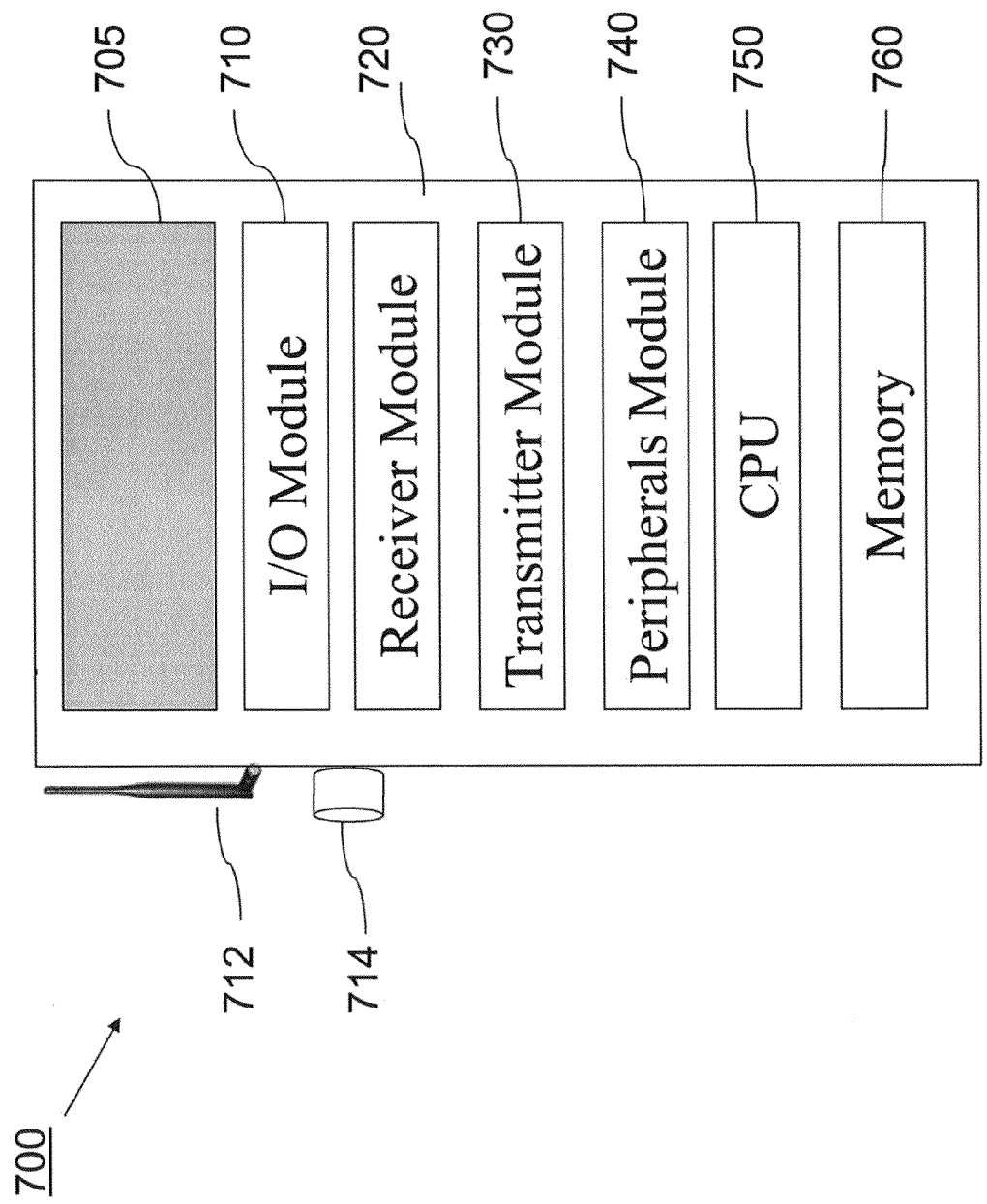
FIG. 7 illustrates an exemplary transreceiving unit, according to an embodiment of the invention.

In some implementations, the functionality of both the listening and talking devices for handling downlink and uplink data communications may be preferably combined in a single device 700 (FIG. 7). This may be known as a "transreceiving unit." However, it is understood that embodiments of the invention, may also be practiced using separate listening and talking devices, or along with transreceiving units.

Figure 1:
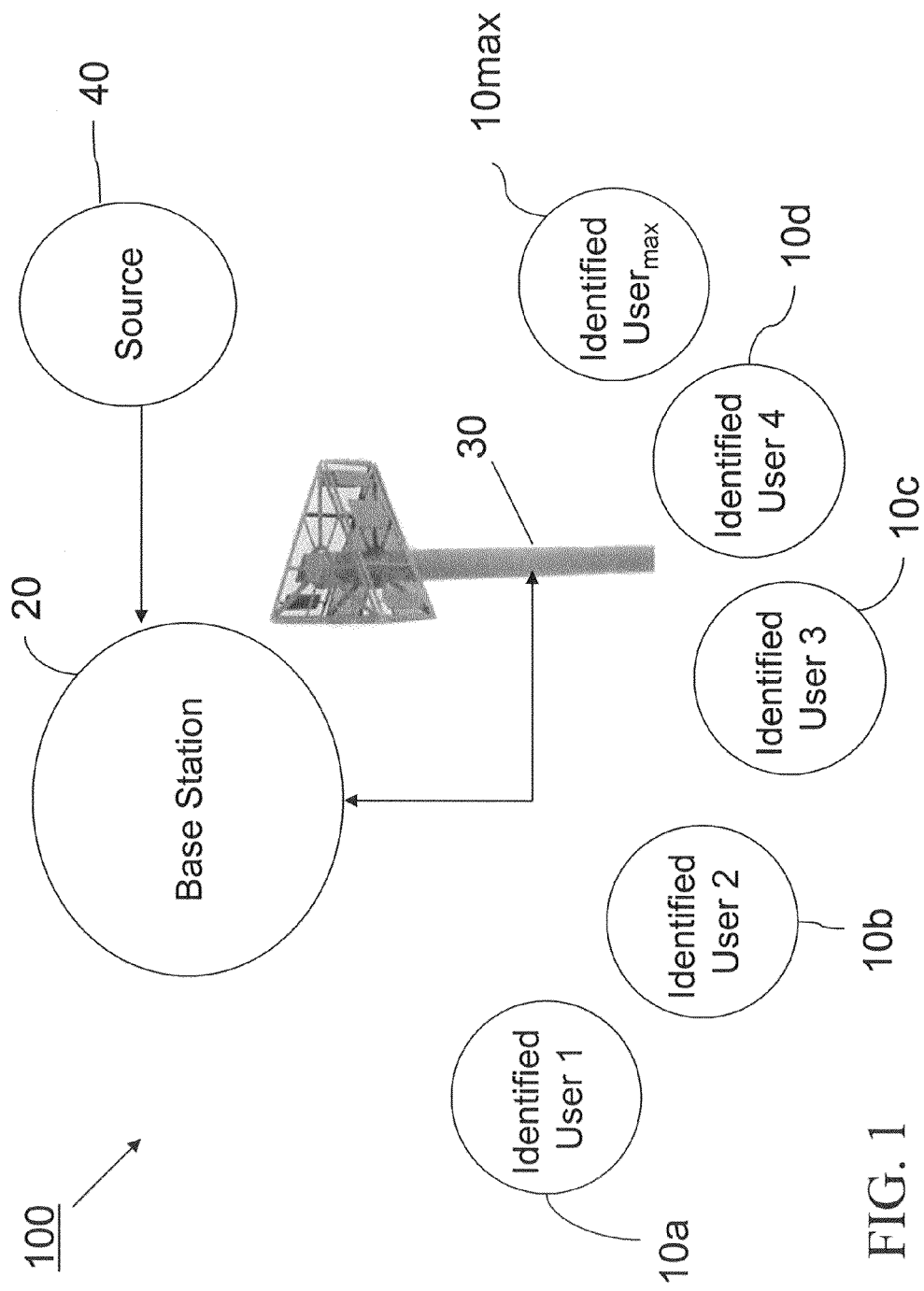
FIG. 1 illustrates a known cellular network.

The architecture 200 may, in some implementations, be integrated with a known network, such as the cellular network 100 (FIG. 1) and/or a packet or switched network 60. Advantageously, the architecture 200 may permit users (talkers), both identified and unidentified to communicate, even though the user (listeners) are unidentified to the broadcaster 50. Other communication means may be employed by users (talkers) to generate communications as well, including telephony, the Internet, Bluetooth®, radio-frequency identification (RF-ID), Wireless Fidelity or "Wi-fi" (IEEE 802.11), Worldwide Interoperability for Microwave Access or "WiMax" (IEEE 802.16), or the like.

Figure 4:
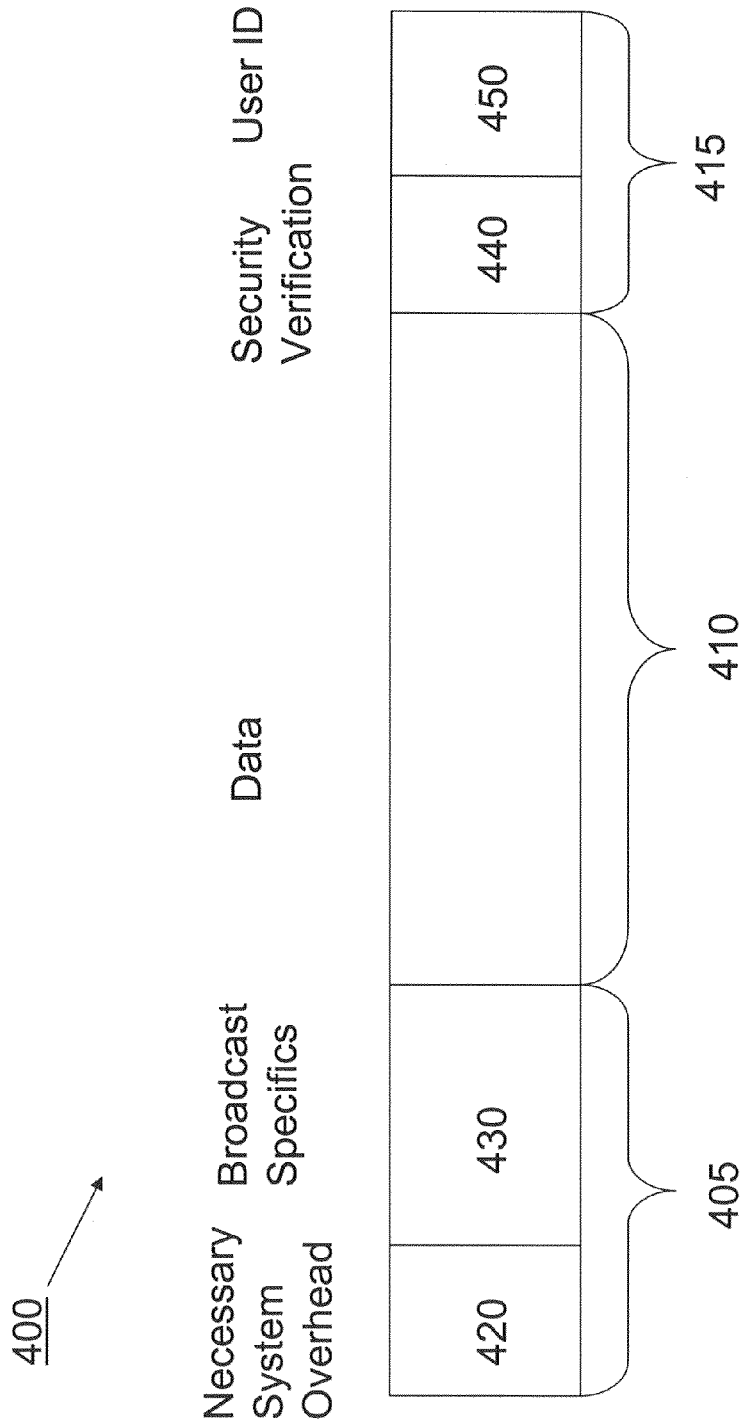
FIG. 4 illustrates an exemplary data communication packet which may be sent from the transreceiving unit to the broadcaster via a packet or switched network, in accordance with certain embodiments of the invention.

When a listener chooses to talk, that user may be considered as going from being unidentified to identified by the broadcaster 50. In order to communicate (in some situations) with the broadcaster 50, the user 10 (talker) may require "logging-in," or entering a password, verifying a message address (fixed or dynamic), verifying an account (pre-existing or otherwise), or using other means to communicate. When talking then, the user 10 may, thus, become "identified" or known to the broadcaster 50. For example, FIG. 2 shows how an unidentified user 10a may become an identified user 10a1 when talking. Communications may require packet communications, for example, using the cellular network 100 or the packet or switched network 60. An example of a packet 400 is illustrated in FIG. 4.

Figure 3:
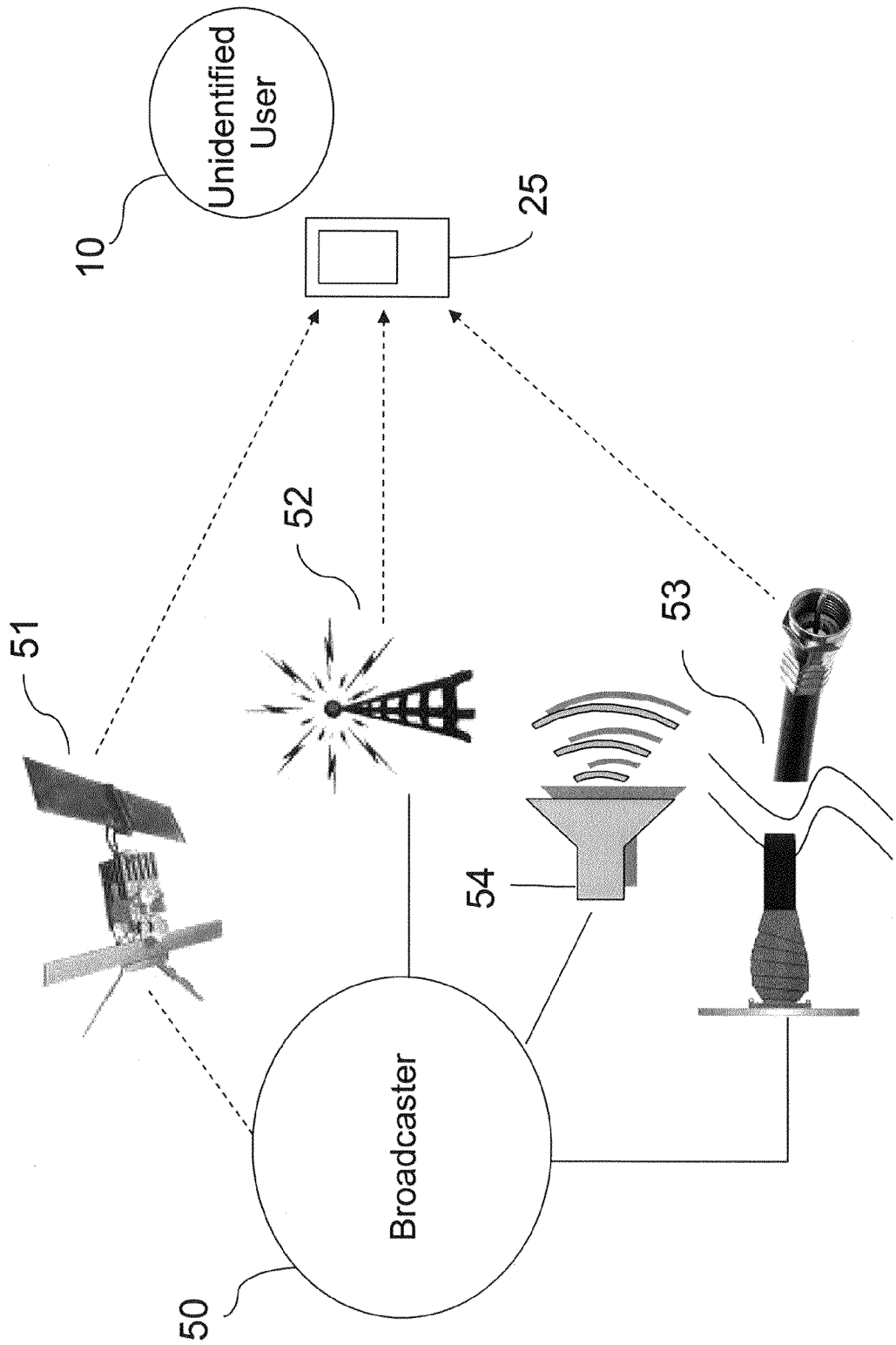
FIG. 3 illustrates the broadcaster broadcasting communications to a user, in accordance with certain embodiments of the invention.

FIG. 3 illustrates an example wherein the broadcaster 50 is broadcasting communications to a user 10, in accordance with embodiments of the invention. The broadcaster 50 may use one or more mass communication technologies to transmit a communication to one or more users (although only one user is shown). In some implementations, the communication technologies may include one or more of a satellite transmission via satellite 51, radio frequency transmission via radio tower 52, a wired transmission via wire or cable 53, or a sound-wave emitter 54. These preceding communication technologies may comprise a means for broadcasting.

The satellite 51 may comprise, for example, one or more geostationary satellites orbiting the Earth. Each of the satellites may include a number of transponders for carrying broadcast signals back to Earth. Users 10 may listen to the satellite broadcast via a satellite dish (not shown). Other satellite technologies may be used also.

The radio tower 52 may support numerous radio frequency (RF) broadcast frequencies or spectrum, for example, between 3 kHz and 300 GHz. The RF broadcast, may include, but is not limited to: AM, FM, television broadcasts (VHF, UHF, etc.), amateur radio ("ham") radio, citizen band radio (CB), multi-use radio service (MURS) or other radio broadcast means and/or spectra.

The wire or cable 53 may include coaxial, twisted pair, plain copper wiring, and other wiring type. In some implementations, the cable 53 may be optical cable or fiber-optic cable The sound-wave emitter 54 may include any device capable of producing or generating pressure or sound waves corresponding to a communication. For example, in some implementations, the sound-wave emitter 54 may include a speaker, a bull-horn, or other audible sound producing device.

As noted, in some instances the user 10 may be equipped with a transreceiving unit 25 (see also FIG. 7: 700) for both receiving the broadcast communication and generating communications. In some embodiment, some users 10 may have a listening device, a talking device, or a transreceiving unit 25. For example, in one implementation, ordinary civilians may be equipped only with listening devices, while military, police, fire, rescue and other first responder personnel may be equipped with talking devices, and/or transreceiving units 25. As such, ordinary civilians may only receive emergency instructions and/or other information from the first responders.

If the user 10 (talker) wishes to respond to or generate a communication, the user may, do so with the aid of the transreceiving unit 25. In some implementations, the downlink and uplink communications between the broadcaster 50 and the transreceiving device 25 (or other devices) may be the same. For example, the broadcast from the broadcaster 50 to the user may be using a wired or cable connection 53, and the user may respond to the broadcaster 50 also using the same wired or cable connection 53. However, the communication may also be sent by the transreceiving device 25 via a different communication means. For example, the broadcast from the broadcaster 50 to the user may be using satellite 51, and the user may response to the broadcaster 50 using the wired or cable connection 53. Alternatively, the user 10 (talker) may communicate with the broadcaster 50 using other known means, such as, for example, cellular network (FIG. 1), packet or switched network 60, etc.

FIG. 4 illustrates an example of a communication packet 400 that may be sent from the transreceiving unit 25 (or other talking device) to the broadcaster 50 via the packet or switched network 60, in accordance with the embodiments of the invention. The transreceiving unit 25 may divide a communication into a plurality of data packets 400 for transmitting, via a packet or switched network.

Each packet 400 may include a header 405, data (payload) 410, and a footer 415. The packet 400 may include additional parts, as necessary. The header 405 may include the necessary system overhead 420 and broadcast specifics 430 (e.g., frame), for transmitting packets data over the packet or switched network 60. The footer 415 (also known as a trailer) may include a security verification 440 and user identification (ID) 450. The packets may be configured for a particular network protocol, such as Transmission Control Protocol/Internet Protocol (TCP/IP), User Datagram Protocol (UDP), or other applicable protocol standard.

The packets 400 may range in length from 7 to 65,542 bytes, and successive packets may vary in length. In some implementations, the network protocols (e.g., IPv4 or IPv6) may dictate packet lengths. In one embodiment, a 16-bit packet, including 12-bit for the header and the remainder for the data (payload), my be utilized.

The Security Verification 440 may be used to code or encrypt data, which may be confidential or sensitive, such as a public key.

The User ID 450 may be used to distinguish different users (talkers). For example, first responders, such as police, fire and rescue personnel may have different User IDs.

In some implementations, one or more fields (e.g., 410, 420, 430, 440, or 450) of the packet 400 may include a "flag." A flag is some machine-readable indicia, such as a number, letter, code, or other means that may be used to process communications. The flag may indicate information regarding the communication, the user, or both. Specific flags, may include, user authority/permissions (or unauthorization), retransmission or rebroadcast parameters, such as timing, delays, group/single mode(s), channel selection, rebroadcast geography choice(s), end user requests, prioritization of requests and broadcasts, or combinations thereof. In one implementation, flags may be generated by the transreceiving device 25. In other implementation, flags may be determined and inserted in a communication from a user by a server or other located on the packet or switched network 50, which maintains user information (e.g., user-name, passwords, personal information, etc.).

In one example, a user 10 may request to broadcast 50 a communication to only fire fighters in New York City. A flag or combination of flags may be included in the packet data transmitted from the user 10 to the broadcast 50 for such purpose. In another example, a broadcaster 50 may permit a chat mode, having up to four or more users "talking" at any one time.

Figure 5:
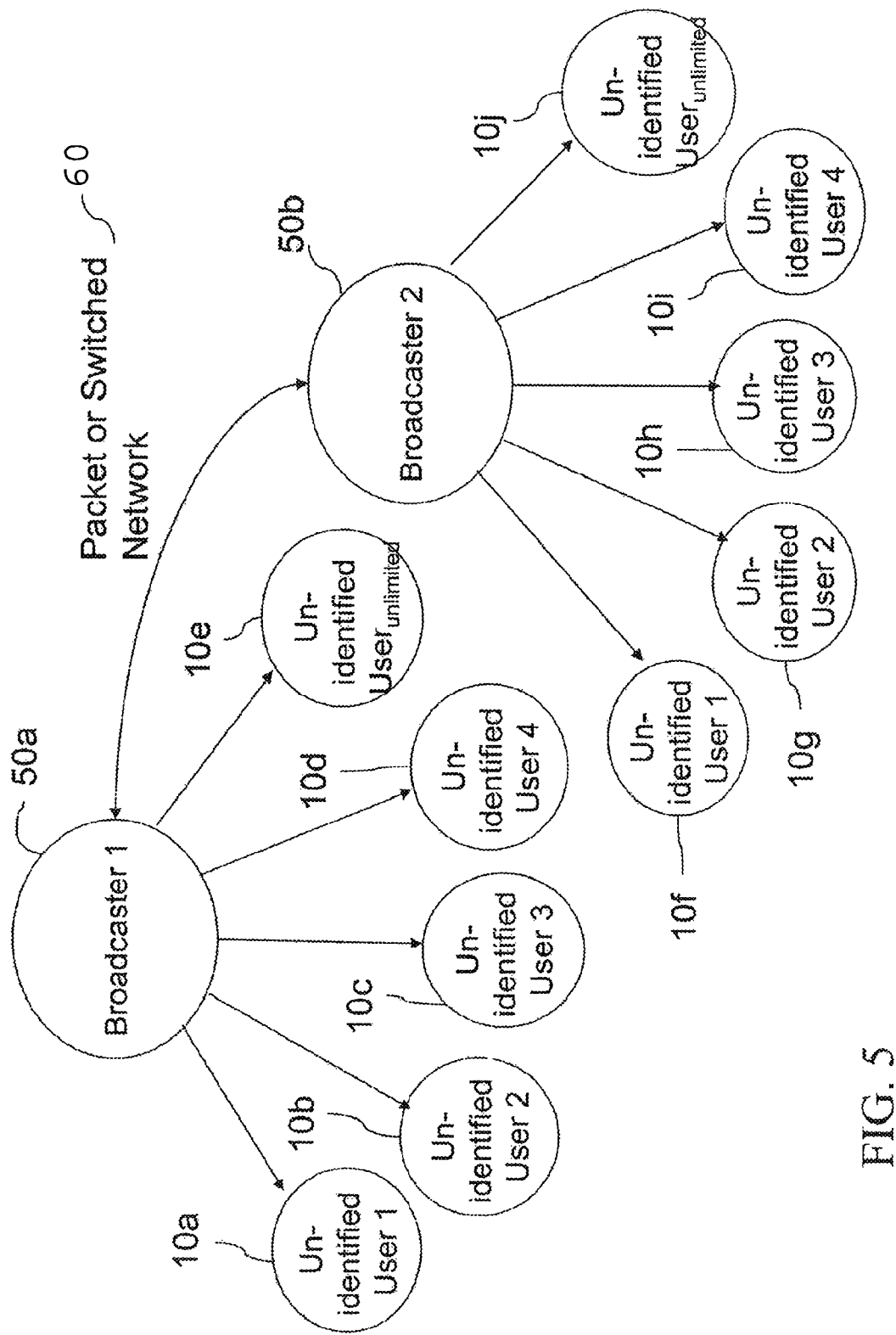
FIG. 5 illustrates a plurality of broadcasters as may be employed in embodiments of the invention.

FIG. 5 illustrates an example of an embodiment according to the invention where there are a plurality of broadcasters 50a, 50b. The plurality of broadcaster 50 may be connected via a packet or switched network 60. The broadcasters 50 may be locally spaced (e.g., in the same city) with respect to each other or remotely spaced (e.g., in different cities, states, or even countries) to each other. In some implementations, a single communication may be broadcasted from a first broadcaster 50a, and simultaneously transmitted to one or more second broadcasters 50b, who in turn, broadcast the communication. In embodiments, broadcasts may be transmitted to the one or more second broadcasters 50b via the packet or switched network 60, and as they are received they may be broadcast via a radio frequency broadcast (although satellite and wire communication means may also be used). When received, the second broadcaster 50b may delay (e.g., 5 seconds) the broadcast thereof or store the communications for later broadcast.

By using multiple broadcasters 50a, 50b, one or more communications may be broadcast to a much larger audience of users 10a, 10b, 20c . . . 10unlimited, and/or over a much larger geographical area or areas. For example, a communication may be received from one user (e.g., 10a) and may be broadcast to the first broadcaster 50a. In some implementations, the first broadcaster 50a may transmit the response to a second broadcaster 50b (and others, not shown) who may each broadcast the response.

Figure 6:
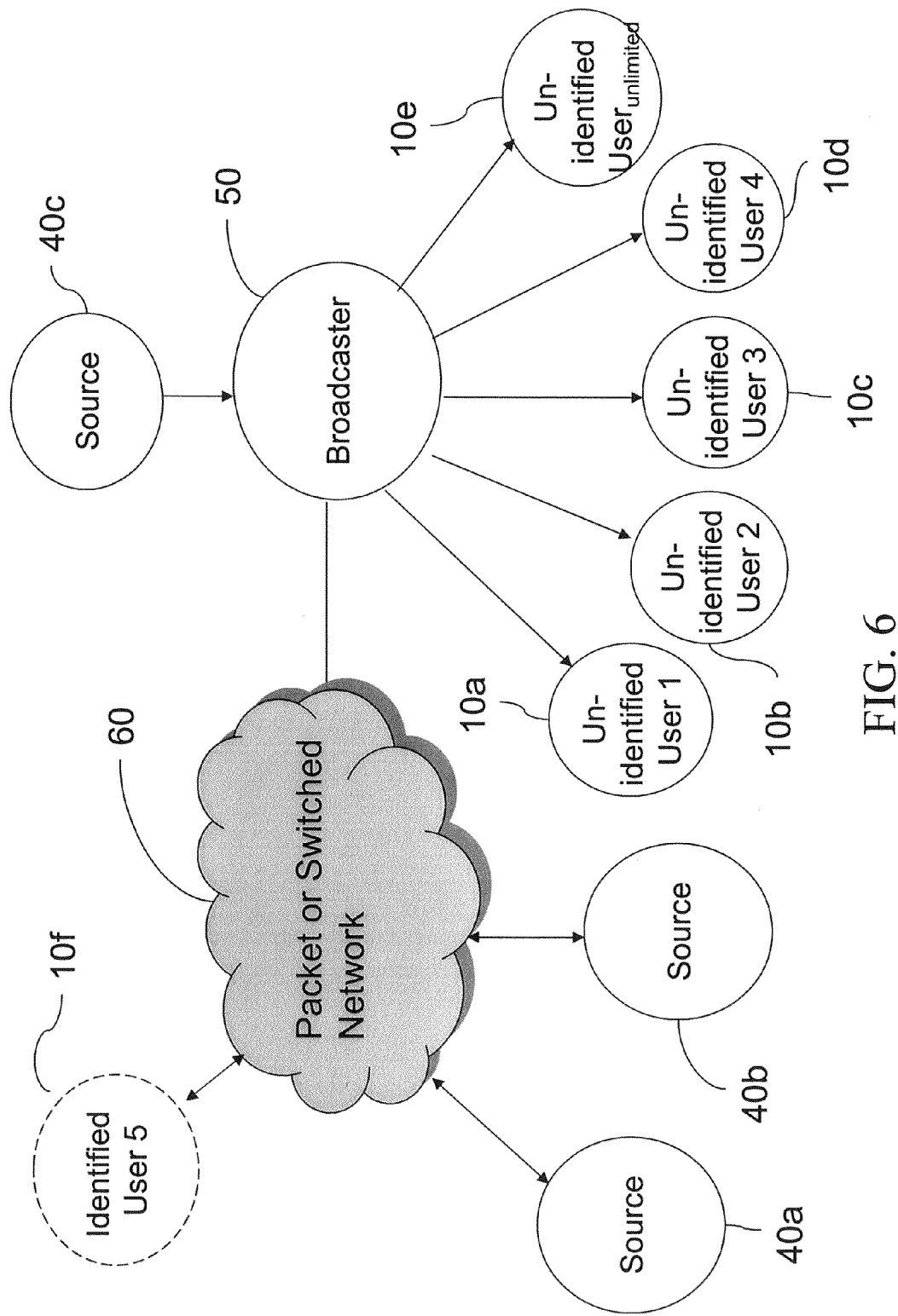
FIG. 6 illustrates a plurality of sources and a single broadcaster in accordance with certain embodiments of the invention.

FIG. 6 illustrates an example of an embodiment according to the invention where there are a plurality of sources 40a, 40b, 40c and a single broadcaster 50. The plurality of sources 40a, 40b, 40c, each may transmit information to a broadcaster 50 directly (e.g., source 40c) or via the packet or switched network 60 (e.g., sources 40a, 40b). In some implementations, the sources 40a, 40b, 40c may include the military, government officials, first responders, etc.

One or more identified users may also transmit information to a broadcast via the packet or switched network 60. Alternatively, in other implementations (not shown) identified users may communicate directly with the broadcaster 50. The identified user may receive the broadcast from broadcaster 50, initially as an unidentified user. In other implementations, the identified user 50 may not have received the communication from the broadcaster 50 at all even though the user is within the range of the broadcaster.

The broadcaster 50 receives transmissions from the source 40a, 40b, 40c and transmits those communications from the source 40, which in turn are received by one or more unidentified users (listeners) 10a, 10b, 10c . . . 10x. The communication may be transmitted by the broadcaster 50, for example, via different communications means, or on different channels an/or frequencies thereof.

Information may be pushed from the source 40 to the broadcaster 50, requested by the broadcaster 50 from the source 40 including request by one or more users (talkers) 10, or both.

FIG. 7 illustrates an example of a transreceiving unit 700 according to an embodiment of the invention. The transreceiving unit 700 may include a display screen 705, an input/output (I/O) module 710, receiver module 720, transmitter module 730, a peripherals module 740, a central processing unit (CPU) 750, and a memory 760.

The display device 705 may include any visual display device (e.g., liquid crystal display (LCD), organic light emitting diode (OLED), plasma, cathode ray tube (CRT), etc.) for display information regarding communications to the user.

The I/O module 710 handles receiving and transmitting communications. The I/O module 710 may be connected to an external antenna 712 and/or external wired connection 714.

The antenna 712 may be used for receiving and transmitting radio or other wireless communications. While an external antenna is illustrated, it will be appreciated that an internal antenna may similarly be used. Also, the wired connection or "jack" 714 may also be provided for interfacing with a wire or cable connection. In one embodiment, the wired connection 714 may be used for data transfer between an additional communication receiving device, such as a satellite dish, cable box, etc.

The receiver module 720 may process the communication received from the one or more broadcasters. This may include decoding or decrypting encoded messages, or converting data. For example, a digital audio or video may be processed for display or playback to the user.

The transmitting module 730 may provide the codec for encoding streams of packets for transmitting the response. In some implementations, the codec generates packets 400 (FIG. 4). In addition, the transmitting module may encode or encrypt data communications transmitted.

The peripherals module 750 may permit a user to understand (e.g., listen to) the broadcast and generate communications. The peripherals module 750 may be connected to one more of a microphone, keyboard, keypad, remote control, mouse, joystick, or other peripheral devices for generating a communications. Alternatively, the user may select information, for example, from a network or memory to transmit. Similarly, peripherals module 750 may be connected to one or more of speakers, printer, or other device for listening to, viewing, or otherwise sensing the communication (e.g., haptic technology).

The CPU 750 may process commands for each of the various module comprising the transreceiving unit 700. The CPU may be a microprocessor unit or integrated circuit (IC).

The memory 760 may include a hard-drive, flash memory, writable or recordable CD/DVD drive, floppy disk, etc. for storing information, in particular, digital information. In some implementations, the memory 760 may be physical removable from the transreceiving unit 700, for easily transferring to another device, such as a computer.

The various modules, described above, may be implemented as software, hardware, or a combination thereof. Software may include computer-readable instructions stored on a tangible computer-readable storage medium (e.g., a disk, nonvolatile memory device, or other tangible computer-readable storage medium). The instructions when executed by the computer are configured to execute a hybrid telecommunications method according to embodiments disclosed herein. Those having skill in the art will recognize that the computer may include a processor (e.g., for executing computer-readable instructions), one or more interfaces (to various peripheral devices or components), memory, one or more storage devices, and/or other components coupled via a bus. One or more software applications and/or modules may be loaded into the memory which may enable the features and functionality and implement the various methods (or algorithms) described in detail herein.

Figure 8:
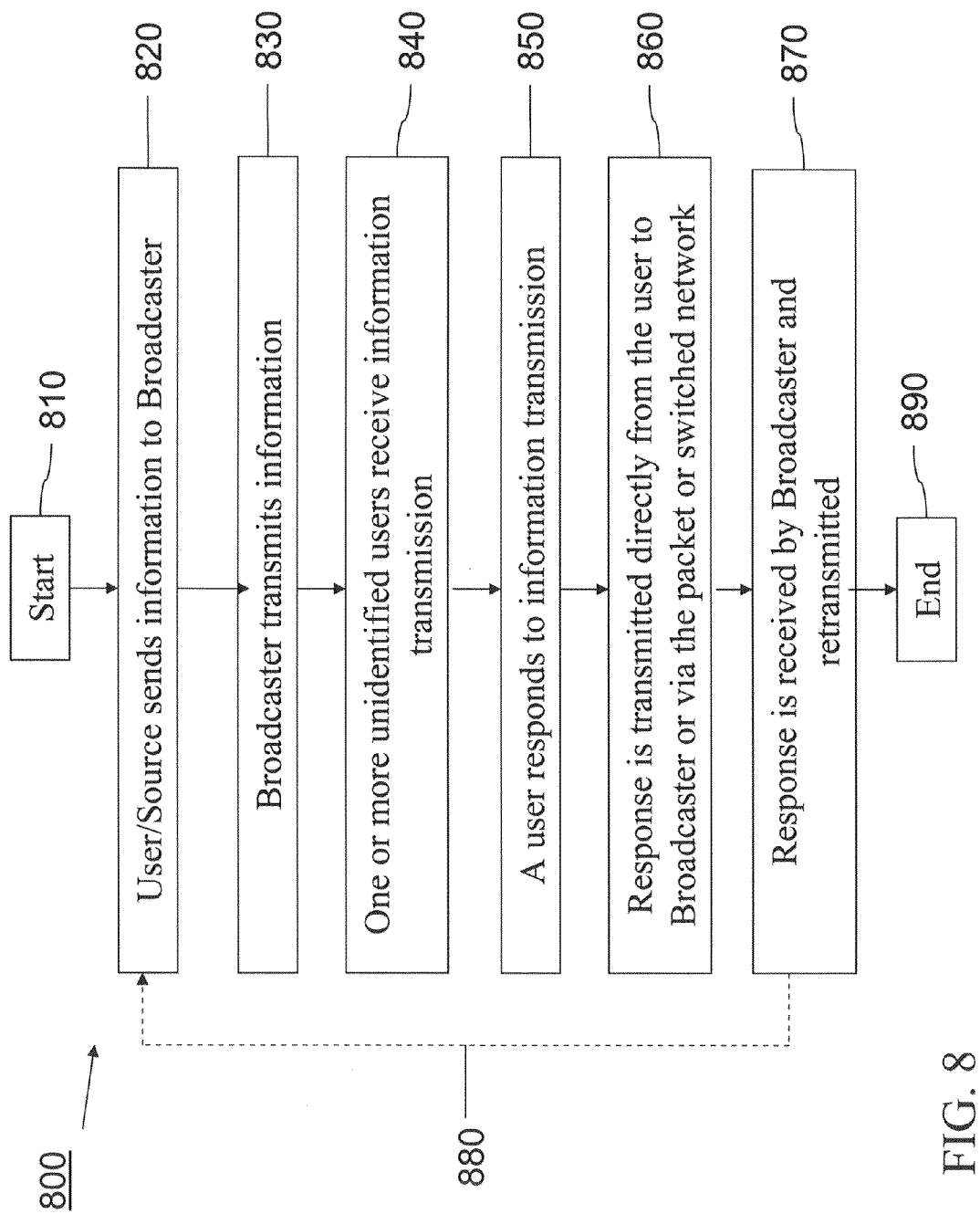
FIG. 8 illustrates a flowchart of a hybrid telecommunications method according to an embodiment of the invention.

FIG. 8 illustrates a flowchart of a hybrid telecommunications method 800 according to embodiments of the invention. In step 810 the method begins.

In step 820, a user 10 and/or a source 40 of content sends information to one or more broadcasters 50. In step 830, the one or more broadcasters 50 transmits this information to one or more unidentified users 10.

In step 840, the one or more unidentified users 10 may receive the transmission. The users 10 are preferably equipped with a transreceiving unit 700 (or listening device). Users 10 may wish to response to the communication or generate a communication of their own to broadcaster 50.

Continuing on to step 850, one or more users 10 may generate a communication using the transreceiving unit 700 (or talking device), which in step 860 is transmitted directly to the broadcaster 50 or via a packet or switched network 60.

In step 870 the communication from the user 10 may be received by the broadcaster 50 and is retransmitted. The process may be repeated, in step 880, as many times as desired. In step 890 the method ends. As will be appreciated, other steps may be added, deleted, and the order of the steps may be changed.

While embodiments have been described in connection with what is presently considered to be the most practical and preferred, it is to be understood that further modifications are possible. This application is intended to cover any variations, uses, equivalent arrangements or adaptations of the invention following, in general, the principles of the invention and including such departures from the present disclosure and followed in the spirit and scope of the appended claims. For example, the methods described herein may be performed in different orders with more or less steps. Likewise, the system and devices may be integrated with other components and in ways differing from what is specifically disclosed.

What is claimed is:

1. A communication method comprising:
   receiving, by one or more processors, a first communication at a broadcaster, the first communication received including media to be broadcast by the broadcaster;
   broadcasting, by the one or more processors, the first communication for receipt by one or more unidentified users without allocating a unique broadcast channel specifically for a corresponding device of the one or more unidentified users;
   receiving, by the one or more processors, a second communication from a device of at least one user of the one or more unidentified users, the second communication comprising a flag that includes an instruction that specifies an amount of time to delay broadcast of the second communication, the second communication generated after receiving the first communication and being responsive to the first communication;
   delay broadcasting, by the one or more processors, the second communication by the amount of time to delay the broadcast of the second communication based on the flag that includes the instruction; and
   broadcasting, by the one or more processors, the second communication after the amount of time to delay the broadcast has elapsed.

2. The method according to claim 1, wherein the flag further comprises a level of seniority of the source of the second communication, the method further comprising:
   receiving, by the one or more processors, a third communication from a device of at least one second user of the one or more unidentified users, the third communication comprising a flag further comprises a second level of seniority of the source of the third communication;
   ranking, by the one or more processors, the second communication and the third communication based on the level of seniority and the second level of seniority; and
   broadcasting, by the one or more processors, second communication based on the ranking.

3. The method according to claim 1, further comprising:
   sending the first communication from the broadcaster to a second broadcaster, via a switched or packet network, for broadcasting by the second broadcaster to one or more unidentified users.

4. The method according to claim 3, further comprising:
   delaying broadcast of the first communication to provide for substantially simultaneous broadcast of the first communication by the broadcaster and the second broadcaster.

5. The method according to claim 1, wherein the flag includes an indication of a level of priority for broadcasting the second communication, the method further comprising:
   prioritizing, by the one or more processors, the second communication relative to at least one other communication based on the level of priority included in the flag, wherein broadcasting the second communication comprises broadcasting the second communication based on the prioritizing.

6. The method according to claim 1, wherein the flag includes indicia for one or more of the following:
   time for broadcast;
   location of rebroadcast;
   importance of communication;
   identity of the user;
   priority of the user; or
   status of the user.

7. The method according to claim 1, wherein the broadcaster that broadcasts the first communication, broadcasts the second communication.

8. The method according to claim 1, wherein the broadcaster receives the flag as a packet communicated directly from a source of the second communication.

9. The method according to claim 1, wherein the first communication includes instructions to the broadcaster to broadcast the first communication to one or more identified users over a specific user unique broadcast channel.

10. The method according to claim 1, wherein the flag data is encrypted to secure the identity of the user who generated the second communication.

11. The method according to claim 1, further comprising delaying the broadcasting of the second communication to one or more unidentified users and one or more identified users consistent with instructions provided by the flag.

12. The method of claim 1 wherein broadcasting the first communication for receipt by the one or more unidentified users includes adding a signal to the first communication that identifies a class of unspecified users that can receive the first communication.

13. The method of claim 12 wherein the class of unspecified users are public servants.

14. The method of claim 12 wherein the class of unspecified users is determined by the cellular phone service provider of the user.

15. The method of claim 1 wherein the flag includes a signal that when read provides an instruction to broadcast the second communication before, during or after another communication.

16. The method of claim 1 wherein at least one unidentified user receives the first communication using a device.

17. The method of claim 16 wherein the device of the at least one unidentified users which receives the first communication is the same the device that generates the second communication.

18. A communication device comprising:
a receiver and a transmitter;
one or more processors configured to:
anonymously receive a communication from a broadcaster via the receiver, wherein the communication is directed to one or more unidentified users, wherein the communication is received from the broadcaster without allocating a unique broadcast channel specifically for the communication device;
transmit a second communication to the broadcaster via the transmitter, wherein the second communication includes a flag that includes an instruction that specifies an amount of time to delay broadcast of the second communication to the broadcaster, where the second communication is broadcast by the broadcaster after the amount of time to delay broadcast of the second communication.

19. The device according to claim 18, wherein the one or more processors are configured to receive the communication via satellite transmission, a radio frequency transmission, a wired transmission, or a sound-wave transmission.

20. The device according to claim 18, wherein the one or more processors are configured to generate a plurality of data packets, each packet including a header, data, and the flag, the flag designating the identity of the communication device sending the communication or parameters for broadcasting the second communication.

21. The device according to claim 18, wherein the receiver and the transmitter comprises a transreceiver.

* * * * *